(12) United States Patent
Tan et al.

(10) Patent No.: US 11,939,950 B2
(45) Date of Patent: Mar. 26, 2024

(54) MODULAR BLADE CONNECTION STRUCTURE, METHOD, AND TOOLING

(71) Applicant: NEWTECH GROUP CO., LTD., Changzhou (CN)

(72) Inventors: Kunlun Tan, Changzhou (CN); Yelin Liu, Changzhou (CN); Lei Cao, Changzhou (CN); Jian Zhang, Changzhou (CN); Gaoyu Bai, Changzhou (CN); Shuang Lin, Changzhou (CN)

(73) Assignee: NEWTECH GROUP CO., LTD., Jiangsu (CN)

( * ) Notice: Subject to any disclaimer, the term of this patent is extended or adjusted under 35 U.S.C. 154(b) by 0 days.

(21) Appl. No.: 18/225,544

(22) Filed: Jul. 24, 2023

(65) Prior Publication Data

US 2023/0366373 A1    Nov. 16, 2023

Related U.S. Application Data

(63) Continuation of application No. PCT/CN2023/077112, filed on Feb. 20, 2023.

(30) Foreign Application Priority Data

May 9, 2022    (CN) .......................... 202210503295.9

(51) Int. Cl.
*F03D 1/06*    (2006.01)
*B29C 65/48*    (2006.01)

(52) U.S. Cl.
CPC ........ *F03D 1/0675* (2013.01); *B29C 65/4825* (2013.01); *F03D 1/0677* (2023.08); *F05B 2230/23* (2013.01); *F05B 2240/302* (2013.01)

(58) Field of Classification Search
CPC .. F03D 1/0675; F03D 1/677; F05B 2240/302; B29C 66/1142
See application file for complete search history.

(56) References Cited

U.S. PATENT DOCUMENTS 8,047,800 B2 * 11/2011 Nies ...................... B29C 65/483
                                                        416/232
8,075,278 B2 * 12/2011 Zuteck .................. F03D 1/0675
                                                        416/223 R (Continued)

FOREIGN PATENT DOCUMENTS

CN    105526044 A  *  4/2016
CN    113685309 A     11/2021

(Continued)

OTHER PUBLICATIONS

English translation of CN-105526044-A (Year: 2016).*
English translation of CN-113775471-A (Year: 2021).*

*Primary Examiner* — J. Todd Newton
*Assistant Examiner* — Wesley Le Fisher
(74) *Attorney, Agent, or Firm* — SZDC Law PC

(57) ABSTRACT

A modular blade connection structure includes a first module, a second module and a structural adhesive module. The first module is provided on an end face thereof with a bonding flange extending into the second module; a gap between the butting surfaces of the first module and the second module is injected with a structural adhesive, which is extruded and cured to form a structural adhesive module; and the thickness of the first module at the starting end of the bonding flange extends towards the inner surface to form a first reinforcement, and the structural adhesive module extends inside the second module in a direction away from the bonding flange to form a second reinforcement. The present disclosure facilitates the control the bonding quality of the double-sided overlapping of the modular blade by (Continued)

means of the bonding flange and the improvement of the fatigue resistance at the assembling position.

5 Claims, 9 Drawing Sheets

(56) References Cited

U.S. PATENT DOCUMENTS

| | | | | |
|---|---|---|---|---|
| 9,797,369 | B2* | 10/2017 | Kratmann | F03D 1/0633 |
| 10,961,982 | B2* | 3/2021 | Broome | B29C 66/81455 |
| 11,072,131 | B2* | 7/2021 | Kiel | F03D 1/0675 |
| 11,203,167 | B2* | 12/2021 | Garm | F03D 1/0675 |
| 2005/0214122 | A1* | 9/2005 | Sorensen | F03D 1/0675 |
| | | | | 416/233 |
| 2006/0188378 | A1* | 8/2006 | Bech | B29C 66/82661 |
| | | | | 416/227 R |
| 2009/0146433 | A1* | 6/2009 | Althoff | F03D 1/065 |
| | | | | 156/305 |
| 2012/0321376 | A1* | 12/2012 | Walters | B29C 65/42 |
| | | | | 403/267 |
| 2015/0292477 | A1 | 10/2015 | Kratmann et al. | |
| 2016/0222945 | A1* | 8/2016 | Shiraishi | F03D 1/0675 |
| 2017/0122287 | A1 | 5/2017 | Dobbe et al. | |
| 2020/0392937 | A1* | 12/2020 | Burchardt | F03D 1/0675 |
| 2022/0154685 | A1* | 5/2022 | Ramanujam | F03D 1/0675 |

FOREIGN PATENT DOCUMENTS

| | | | | |
|---|---|---|---|---|
| CN | 113775471 | A * | 12/2021 | |
| CN | 114183296 | A | 3/2022 | |
| CN | 114851581 | A | 8/2022 | |
| EP | 2626196 | A1 * | 8/2013 | B29D 99/0028 |
| EP | 3769940 | A1 * | 1/2021 | B29C 65/48 |

* cited by examiner

MODULAR BLADE CONNECTION STRUCTURE, METHOD, AND TOOLING

This application is a Continuation Application of PCT/CN2023/077112, filed on Feb. 20, 2023, which claims priority to Chinese Patent Application No. 202210503295.9, filed on May 9, 2022, which is incorporated by reference for all purposes as if fully set forth herein.

TECHNICAL FIELD

The present disclosure relates to the field of wind turbine blade technology, in particular to a modular blade connection structure, method, and tooling.

BACKGROUND

Wind turbine blade is the core component of wind turbine to convert natural wind energy into electricity. With the intensification of market competition, wind turbine blades begin to develop in the direction of large size and light weight.

In the related technologies known to the inventor, the manufacture of wind turbine blades mostly uses molds for processing. However, with the development of large-scale wind power blades, ordinary molds can no longer meet the manufacturing needs. The inventors began to study the manufacturing technology of modular wind turbine blades. The modular fabrication, on the one hand, can reduce the footprint of the mold and the production difficulty, on the other hand, can also reduce the difficulty of transportation and installation of wind turbine blades.

Compared with the manufacture of one-piece blades, how to ensure the strength of the connection points of modular blade segments has become an urgent problem to be solved.

The information disclosed in this background section is only intended to deepen the understanding of the overall background of the present disclosure, and should not be regarded as an acknowledgment or any form of suggestion that the information constitutes the prior art known to those skilled in the art.

SUMMARY

In view of at least one of the above technical problems, the present disclosure provides a modular blade connection structure, method and tooling, which improves the connection strength of a first module and a second module by extending a bonding flange into the second module and thickening the connection between the first module and the bonding flange.

According to a first aspect of the present disclosure, there is provided a modular blade connection structure, comprising: a first module, a second module and a structural adhesive module;
  wherein the first module and the second module are provided opposite each other, and the first module is provided on an end face thereof with a bonding flange extending towards the second module, the bonding flange extending into the second module;
  wherein there is a gap between the butting surface of the first module and the butting surface of the second module, and between the bonding flange and an inner wall of the second module, the structural adhesive module being filled in the gap and cured by extrusion; and
  wherein the first module and the second module are flush in outer surface, the thickness of the first module at the starting end of the bonding flange extends towards the inner surface to form a first reinforcement, and the structural adhesive module extends inside the second module in a direction away from the bonding flange to form a second reinforcement.

In some embodiments of the present disclosure, the first reinforcement gradually increases in thickness from a direction away from the bonding flange to a direction towards the bonding flange.

In some embodiments of the present disclosure, the second reinforcement gradually decreases in thickness in a direction away from the bonding flange.

In some embodiments of the present disclosure, the inclination ratio of the first reinforcement and the second reinforcement is 1:30 to 1:20.

In some embodiments of the present disclosure, the first reinforcement, the bottom of the bonding flange within the second module, and the second reinforcement are further covered with a composite reinforcement layer.

According to a second aspect of the present disclosure, there is provided a modular blade connection method applied to the modular blade connection structure according to the first aspect, comprising the following steps:
  preparing a first module and a second module;
  applying a structural adhesive to the butting surfaces of the first module and the second module;
  butting the first module and the second module to a set position, and applying a set pressure along the butting direction of the first module and the second module;
  when the pressure along the butting direction reaches a stop holding pressure, applying a set pressure on both sides in the thickness direction to cause the structural adhesive at the edge of the bonding flange to overflow until the curing is completed;
  wherein the first module is thickened near the bonding flange to form a first reinforcement when preparing the first module; and
  wherein when the pressure is applied in the thickness direction so that the structural adhesive at the edge of the bonding flange overflows, the overflowing structural adhesive is scraped in the direction away from the flange to form a second reinforcement.

In some embodiments of the present disclosure, the first reinforcement is configured to gradually increase in thickness in a direction towards the bonding flange when preparing the first module, and the second reinforcement is configured to decrease in thickness in a direction away from the bonding flange when the second reinforcement is formed by scraping.

In some embodiments of the present disclosure, if the structural adhesive overflows from the outside of the butting surfaces of the first module and the second module after curing by applying pressure in the thickness direction, the overflow structural adhesive is polished to eliminate defects.

In some embodiments of the present disclosure, after curing is completed and the defects are eliminated, the inside of the butting surface of the first module is covered with a composite reinforcement layer.

According to a third aspect of the present disclosure, there is provided a modular blade connection tooling applied to the modular blade connection structure according to the first aspect, comprising:
  an internal pressing mechanism provided at both ends thereof with an extrusion block in contact with part of the first reinforcement and part of the inner wall of the bonding flange, the extrusion block following the inner wall of the first module and the second module, the internal top pressing mechanism being configured to apply pressure in opposite directions; and an external support mechanism provided on the outside of the butting surfaces of the first module and the second module and provided opposite to each of the two extrusion blocks, the external support mechanism being provided with a bracket block following the outer surface of the first module and the second module, the bracket block having an adhesive overflow slot at the butting surfaces of the first module and the second module that is provided towards the opening of the butt joint.

The present disclosure is advantageous in that it facilitates the control the bonding quality of the double-sided overlapping of the modular blade by means of the bonding flange extending from the first module toward the inside of the second module, and facilitates the improvement of the fatigue resistance at the assembling position by means of the first reinforcement formed by the increased thickness of the first module and the second reinforcement formed by the overflow of the structural adhesive module, while reducing the influence on the aerodynamic performance of the blade.

DESCRIPTION OF THE DRAWINGS

In order to more clearly illustrate the embodiments of the present disclosure or the technical solutions in the prior art, the accompanying drawings to be used in the description of the embodiments or prior art will be briefly described below. It is obvious that the accompanying drawings in the following description are only some of the embodiments recorded in the present disclosure, and other accompanying drawings can be obtained according to these accompanying drawings without creative work for those of ordinary skill in the art.

DESCRIPTION OF THE EMBODIMENTS

The technical solutions in the embodiments of the present disclosure will be described clearly and completely in conjunction with the accompanying drawings in the embodiments of the present disclosure. Obviously, the described embodiments are only a part of the embodiments of the present disclosure, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present disclosure. The terms used herein are for the purpose of describing specific embodiments only and are not intended to limit the present disclosure. The term "and/or" as used herein includes any and all combinations of one or more of the related listed items.

FIGS. 1-6 illustrate a modular blade connection structure, comprising: a first module 10, a second module 20 and a structural adhesive module 30.

Figure 1:
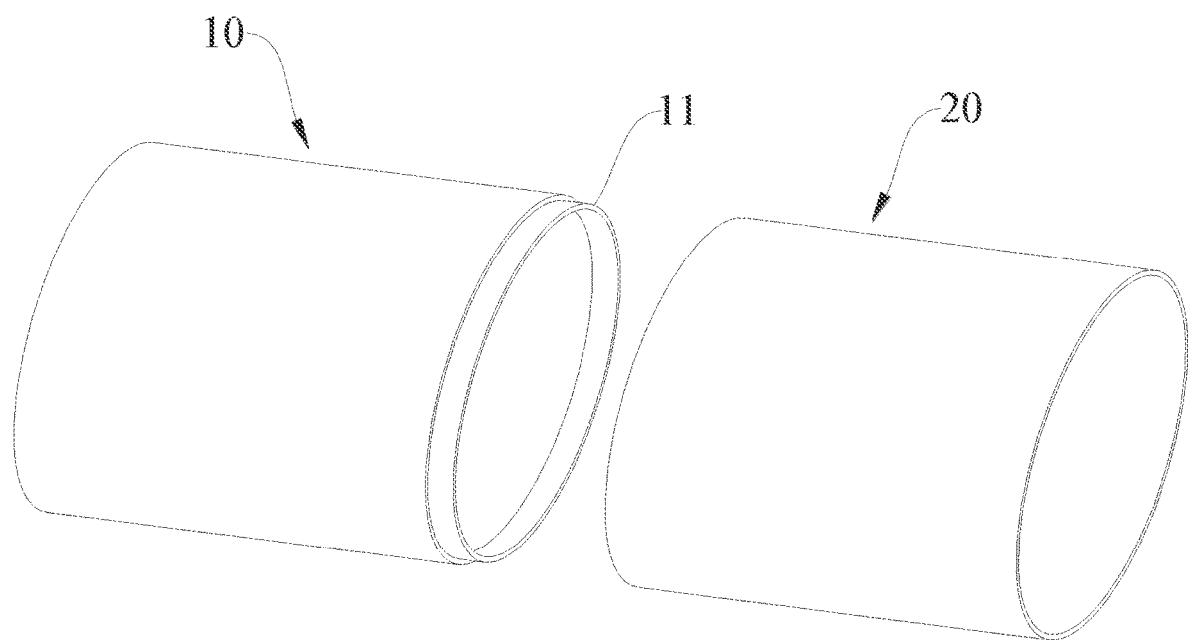
FIG. 1 is a schematic exploded diagram of a modular blade connection structure according to an embodiment of the present disclosure.
Figure 2:
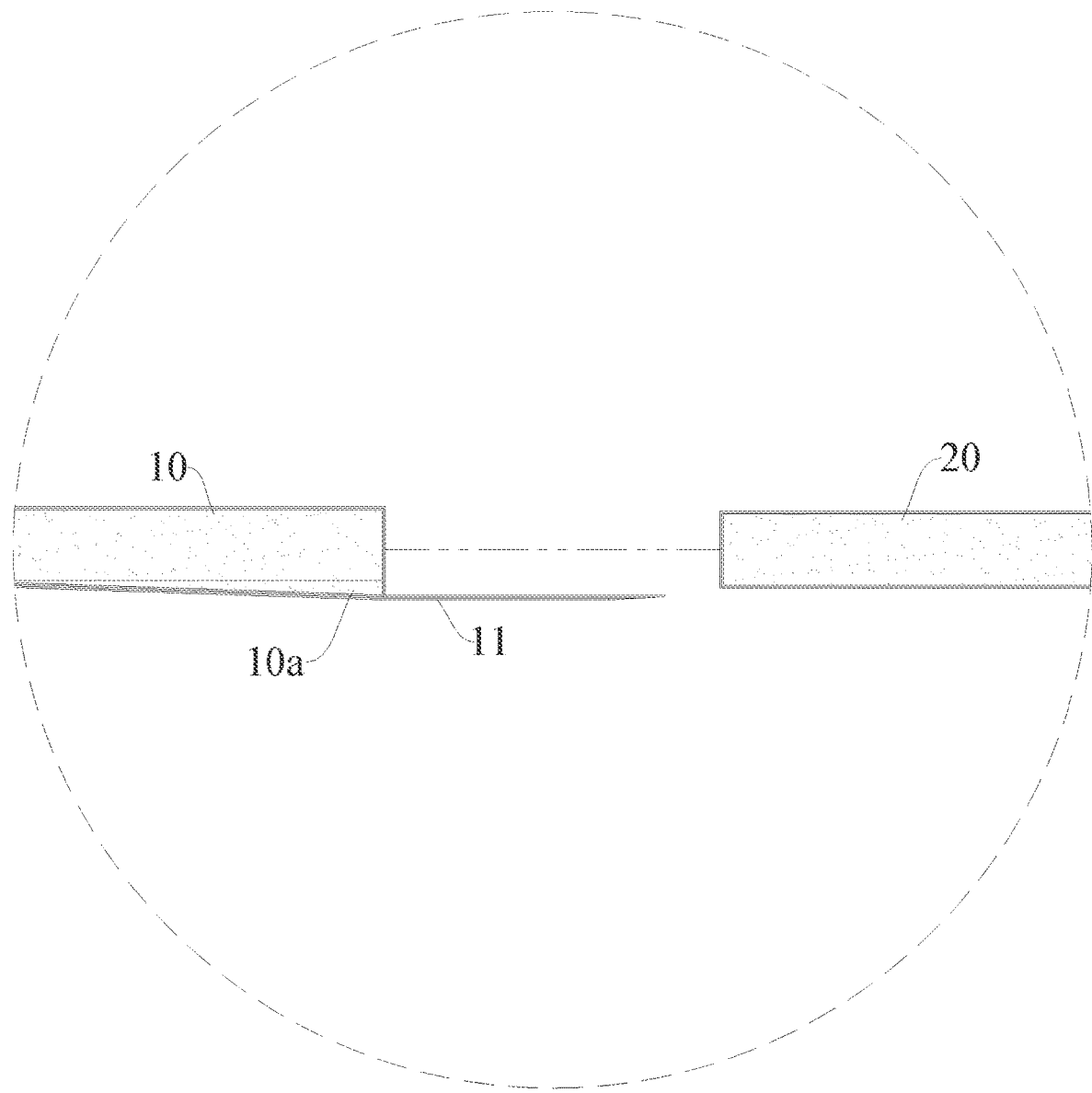
FIG. 2 is an axial cross-sectional view of a modular blade connection structure according to an embodiment of the present disclosure.
Figure 3:
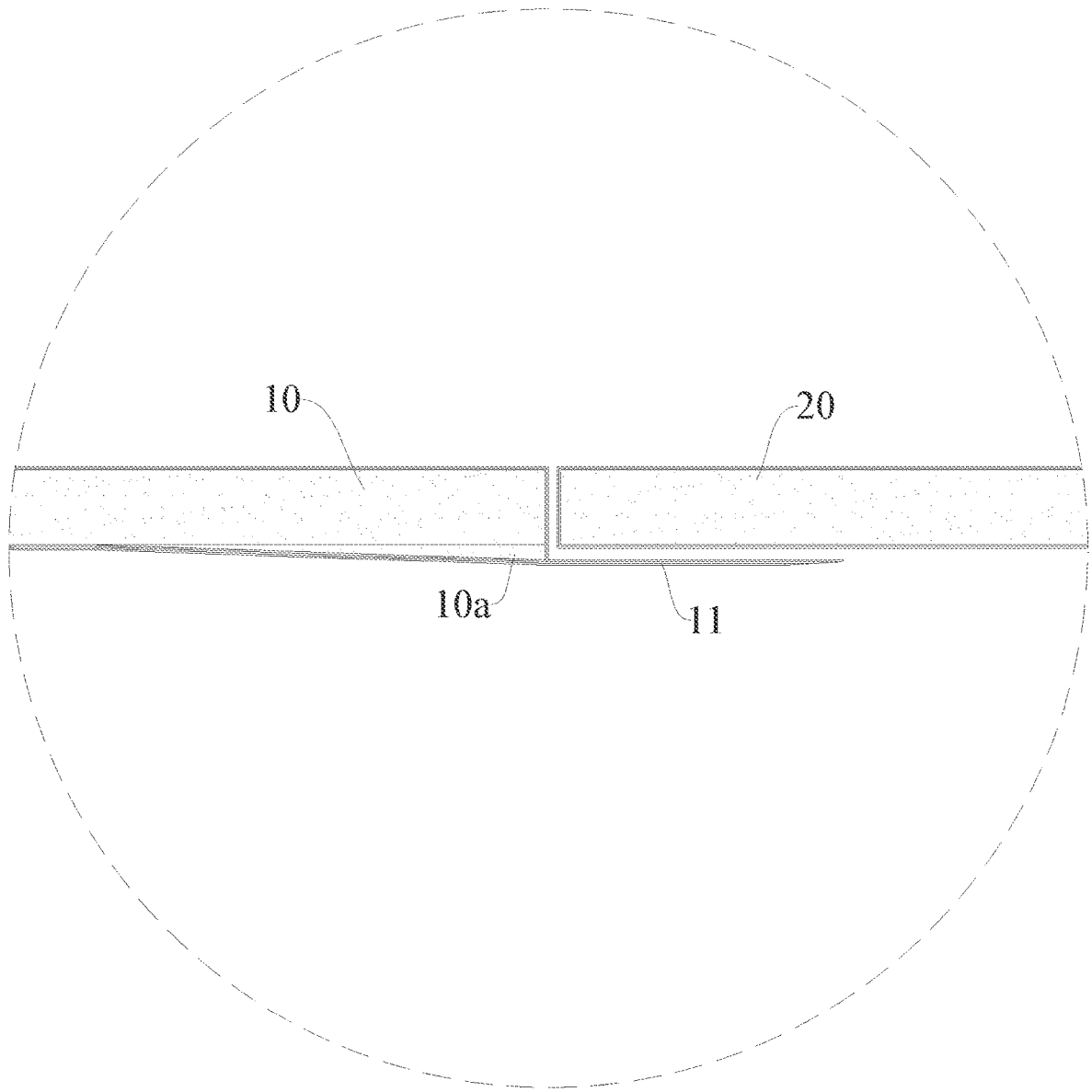
FIG. 3 is a schematic diagram of the butt structure of the first module and the second module according to an embodiment of the present disclosure (excluding the structural adhesive module)

As shown in FIG. 1, the first module 10 and the second module 20 are provided opposite each other, and the first module 10 is provided on an end face thereof with a bonding flange 11 extending towards the second module 20, the bonding flange 11 extending into the second module 20. In some embodiments of the present disclosure, the bonding flange 11 is directly processed and formed at the end of the first module 10, and the instability of the segmented connection can be reduced by integral molding. Referring to FIG. 2 and FIG. 3, in the butting process, it is necessary to abut the first module 10 and the second module 20 so that the bonding flange 11 enters the inside of the second module 20. As shown in FIG. 3, when the first module 10 and the second module 20 are butt joint, there is a gap between the butting surface of the first module 10 and the butting surface of the second module 20, and between the bonding flange 11 and an inner wall of the second module 20, a structural adhesive module 30 is filled in the gap and cured by extrusion. It should be noted that the gap here is to facilitate the description of the structural adhesive module 30, and is not a limitation on the way the structural adhesive module 30 is formed. In the embodiment of the present disclosure, the structural adhesive is applied to the butting surfaces and the bonding flange 11 before the first module 10 is butt joint to the second module 20. Of course, in other embodiments of the present disclosure, it is possible to leave a gap in advance and then inject the structural adhesive into the gap.

Figure 4:
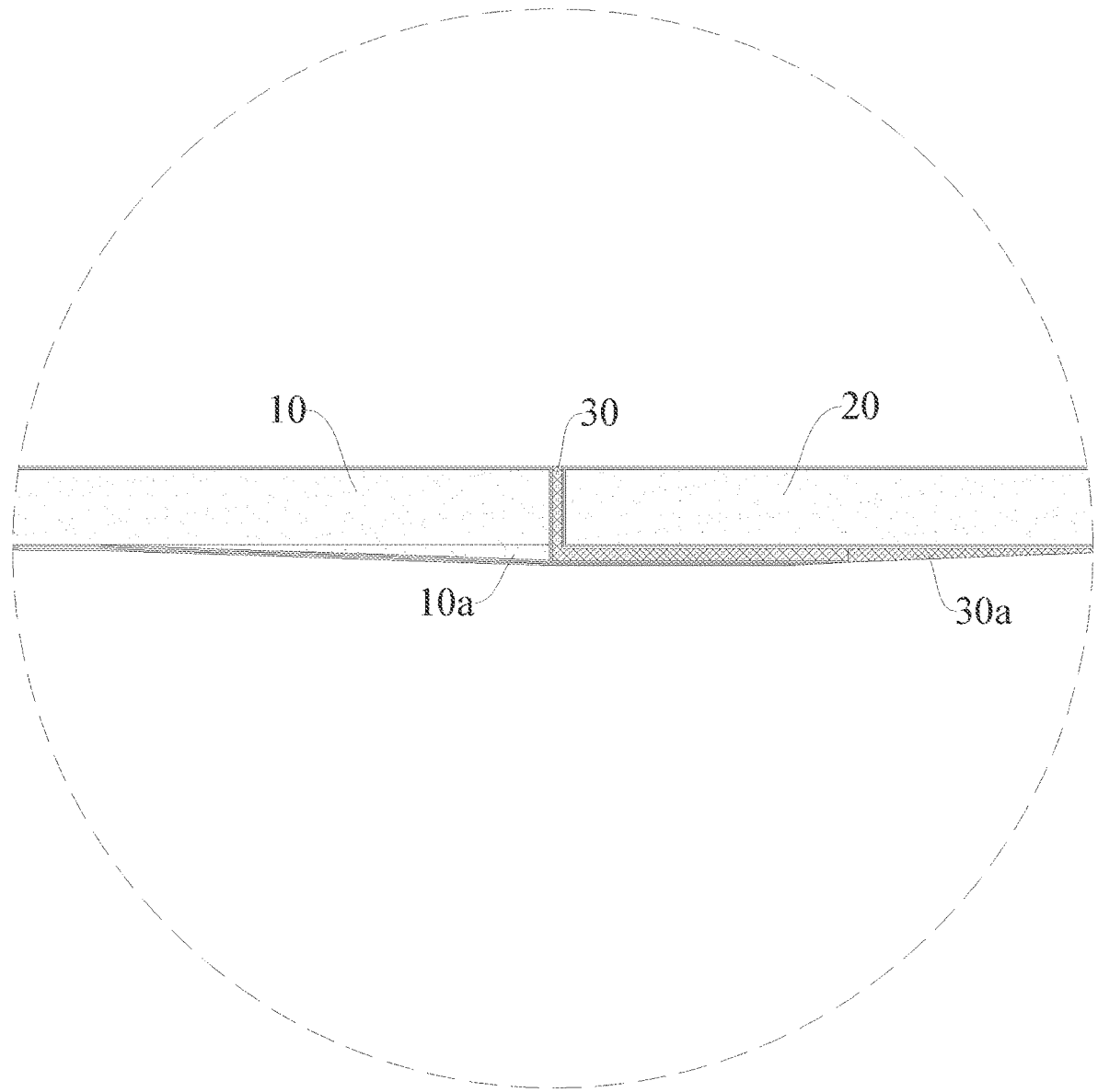
FIG. 4 is a schematic diagram of the butt structure of the first module and the second module according to an embodiment of the present disclosure.

As shown in FIG. 4, in the embodiment of the present disclosure, the first module 10 and the second module 20 are flush in outer surface. The thickness of the first module 10 at the starting end of the bonding flange 11 extends towards the inner surface to form a first reinforcement 10a, and the structural adhesive module 30 extends inside the second module 20 in a direction away from the bonding flange 11 to form a second reinforcement 30a. By providing the first reinforcement 10a, the support strength of the bonding flange 11 is improved, and the stress concentration at the flange can be reduced when the first module 10 and the second module 20 are connected to form the whole. Moreover, in the embodiment of the present disclosure, the provision of the second reinforcement 30a formed by the overflow of structural adhesive can further improve the bonding strength between the bonding flange 11 and the second module 20 on the one hand, and can reduce the stress concentration at the butt joint as a whole after the structural adhesive is cured when the stress is applied.

In the above disclosure, it facilitates the control the bonding quality of the double-sided overlapping of the modular blade by means of the bonding flange 11 extending from the first module 10 toward the inside of the second module 20, and facilitates the improvement of the fatigue resistance at the assembling position by means of the first reinforcement 10a formed by the increased thickness of the first module 10 and the second reinforcement 30a formed by the overflow of the structural adhesive module 30, while reducing the influence on the aerodynamic performance of the blade.

In some embodiments of the present disclosure, reference is made to FIG. 4, the first reinforcement 10a gradually increases in thickness from a direction away from the bonding flange 11 to a direction towards the bonding flange 11. In this way, the thickness of the first module 10 at the position near the bottom of the bonding flange 11 is maximized, which can not only ensure the structural strength of the bonding flange 11, but also reduce the blade manufacturing cost and improve its economic practicality. Continuing with reference to FIG. 4, in the embodiment of the present disclosure, the second reinforcement 30a gradually decreases in thickness in a direction away from the bonding flange 11. In this way, a form of symmetry with the first reinforcement 10a is basically achieved, which on the one hand can improve the force balance at the joint, and on the other hand, it is also convenient to secure the subsequent processing process to further improve the connection strength of the first module 10 and the second module 20.

Figure 6:
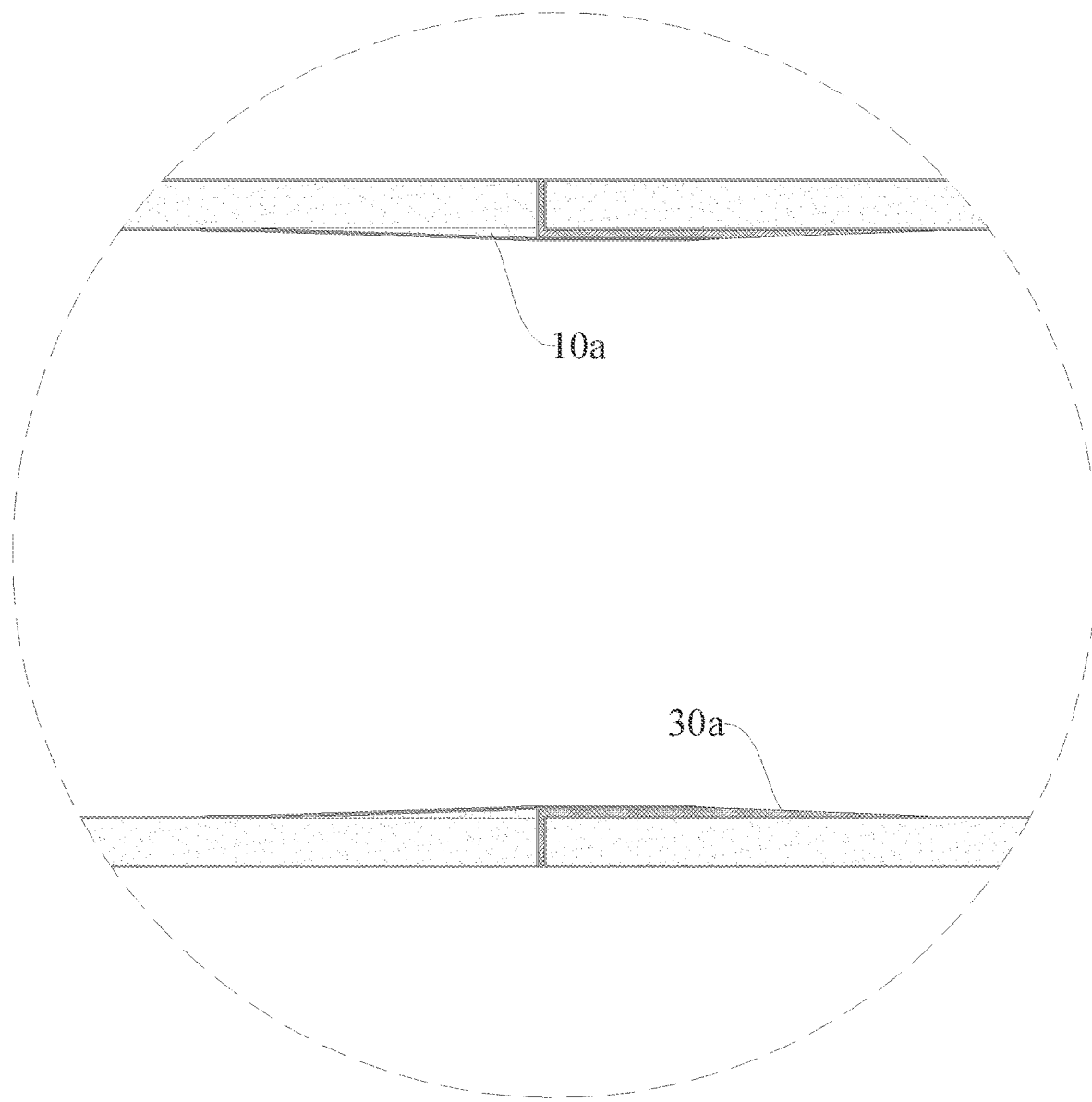
FIG. 6 is a schematic diagram of the inclined structure of the first reinforcement and the second reinforcement according to an embodiment of the present disclosure.

In the embodiment of the present disclosure, in order to facilitate processing, both the first reinforcement 10a and the second reinforcement 30a are inclined in a straight line, as shown in FIG. 6, and the inclination ratio of the two in the thickness direction and the butt joint length direction ranges from 1:30 to 1:20. Such structural configuration can not only ensure the connection strength, but also can reduce the manufacturing cost and the manufacturing difficulty to meet the high-quality and low-cost requirements of segmental manufacturing of wind turbine blades.

Figure 5:
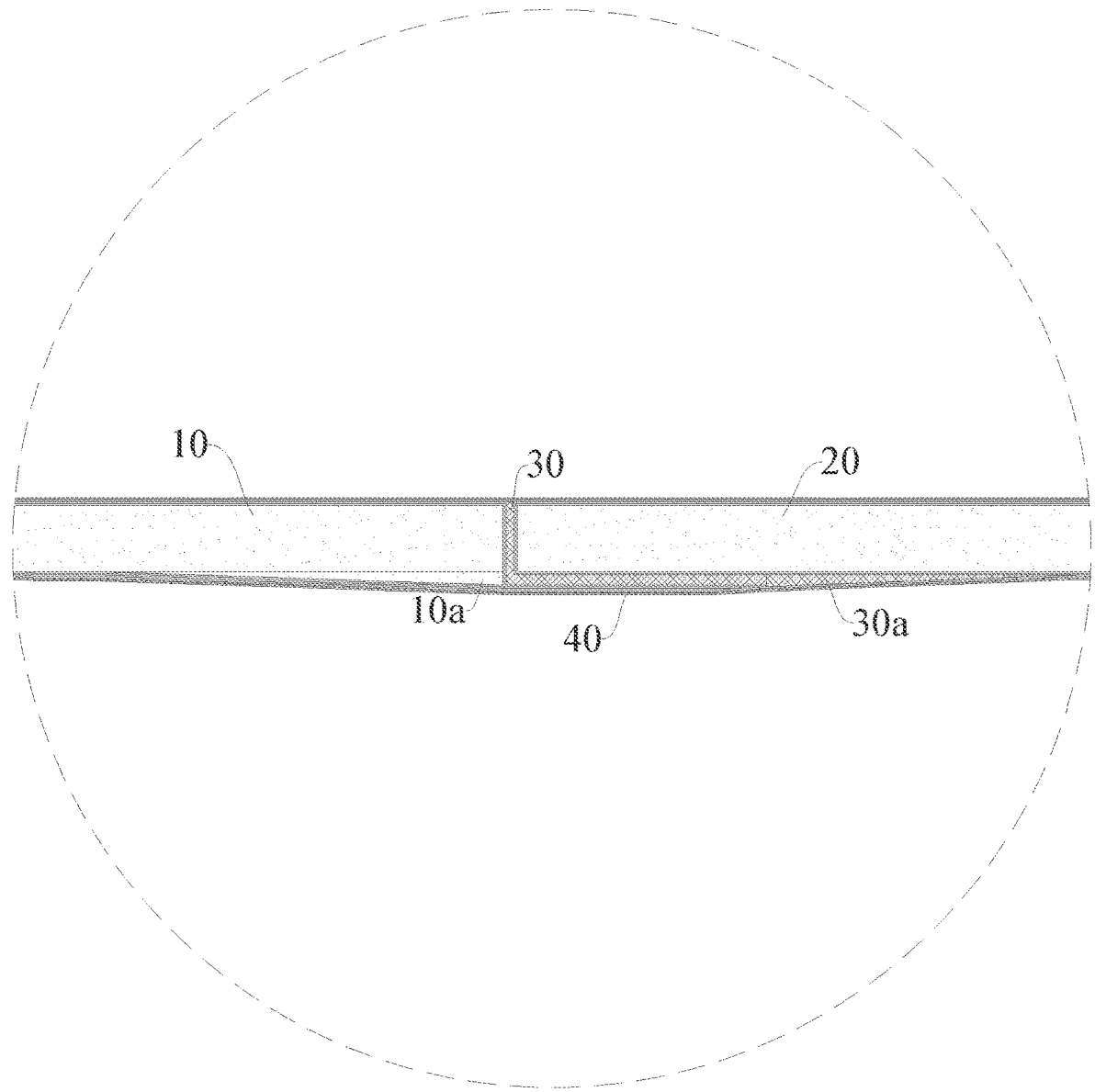
FIG. 5 is a schematic diagram of the butt structure covered with a composite reinforcement layer according to an embodiment of the present disclosure.

As shown in FIG. 5, in the embodiment of the present disclosure, the first reinforcement 10a, the bottom of the bonding flange 11 within the second module 20, and the second reinforcement 30a are further covered with a composite reinforcement layer. The bottom here refers to the inner wall after the first module 10 and the second module 20 are connected. In the embodiment of the present disclosure, the specific material of the composite reinforcement layer is carbon fiber cloth or glass fiber cloth. The composite reinforcement layer further improves the overall support performance and tensile properties of the butting surfaces as a whole.

In the embodiment of the present disclosure, there is also provided a modular blade connection method applied to the modular blade connection structure described above, comprising the steps described in details below.

At step S10, a first module 10 and a second module 20 are prepared. Here, the first module 10 and the second module 20 are separately prepared in a mould. In some embodiments of the present disclosure, the first module 10 and the second module 20 are manufactured by segment splicing. In this way, each segment can be transported to the site for installation after the preparation is completed, so as to improve the convenience in the preparation process of the wind turbine blades.

At step S20, a structural adhesive is applied to the butting surfaces of the first module 10 and the second module 20. In the embodiment of the present disclosure, the butting surface is the surface corresponding to the gap as shown in FIG. 3, specifically the side and outer surface of the flange and the end surface of the second module 20 towards the first module 10 and the inner surface of the second module 20.

At step S30, the first module 10 and the second module 20 are butt to a set position, and a set pressure is applied along the butting direction of the first module 10 and the second module 20. Here, the sequence of the butting and force application is not limited, because generally the structural adhesive is extruded during the butting process, and a certain deformation will occur. The general sequence is to butt the modules first, and then extrude according to the set pressure until the first module 10 and the second module 20 reach the set position.

At step S40, when the pressure along the butting direction reaches a stop holding pressure, a set pressure is applied on both sides in the thickness direction to cause the structural adhesive at the edge of the bonding flange 11 to overflow until the curing is completed. Since the structural adhesive has some fluidity before curing, it will overflow from the butting surface when extruding the first module 10 and the second module 20. When the structural adhesive overflows, it means that the interior has been filled with structural adhesive, and thus the amount of structural adhesive can be determined to meet the demand. If no structural adhesive overflow is found, it means that the amount of adhesive applied is not enough and needs to be replenished.

The first module 10 is thickened near the bonding flange 11 to form a first reinforcement 10a when preparing the first module 10.

When the pressure is applied in the thickness direction so that the structural adhesive at the edge of the bonding flange 11 overflows, the overflowing structural adhesive is scraped in the direction away from the flange to form a second reinforcement 30a. Here, the structure has been described in detail above, and the structure as well as its effect can be understood with reference to the above description.

In the embodiment of the present disclosure, when the first module 10 is prepared, the first reinforcement 10a is configured to gradually increase in thickness in a direction towards the bonding flange when preparing the first module, and the second reinforcement 30a is configured to decrease in thickness in a direction away from the bonding flange 11 when the second reinforcement 30a is formed by scraping. This is also described in detail above, and its function and effect will not be described in detail here. However, it should be noted that after the structural adhesive overflows, it is scraped before it is cured to form a structure with gradually decreasing thickness.

Figure 7:
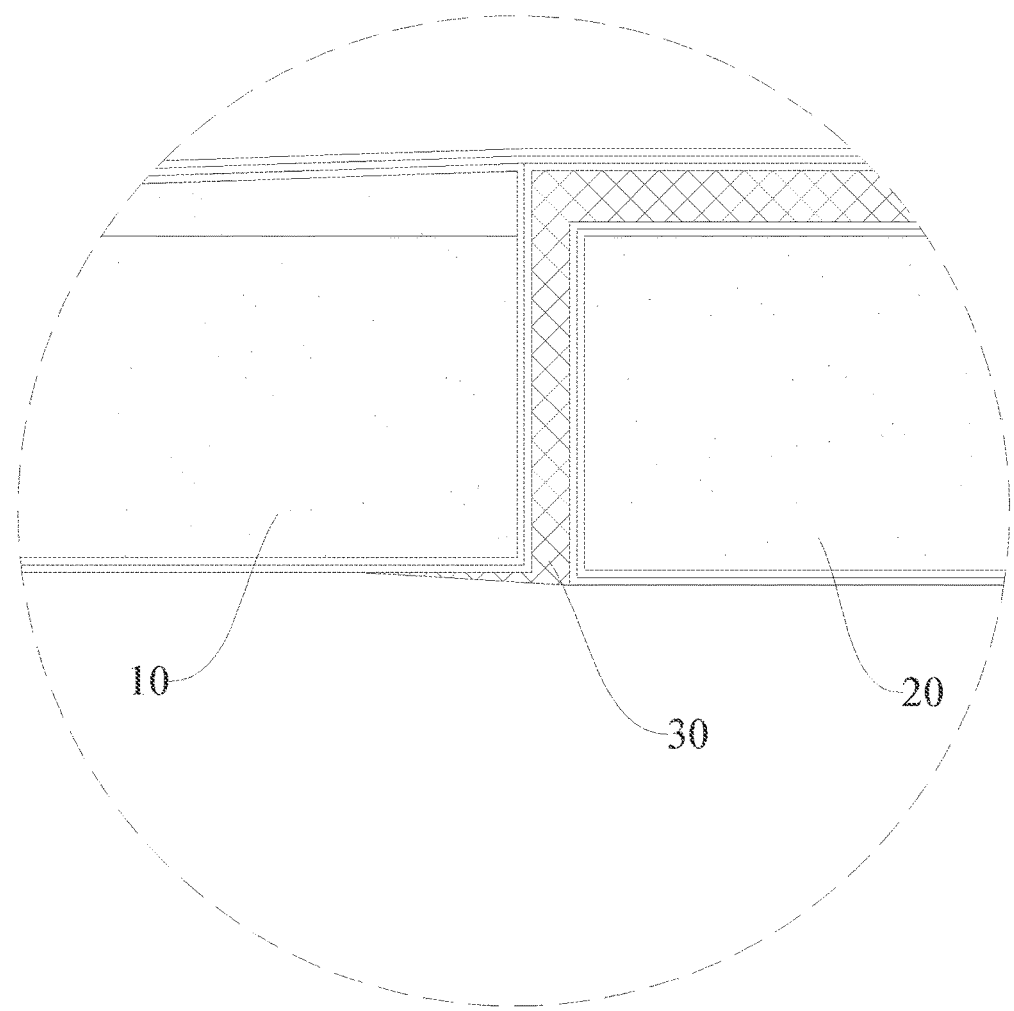
FIG. 7 is a schematic diagram of the crimping positions with defects during the pressure application process according to an embodiment of the present disclosure.
Figure 8:
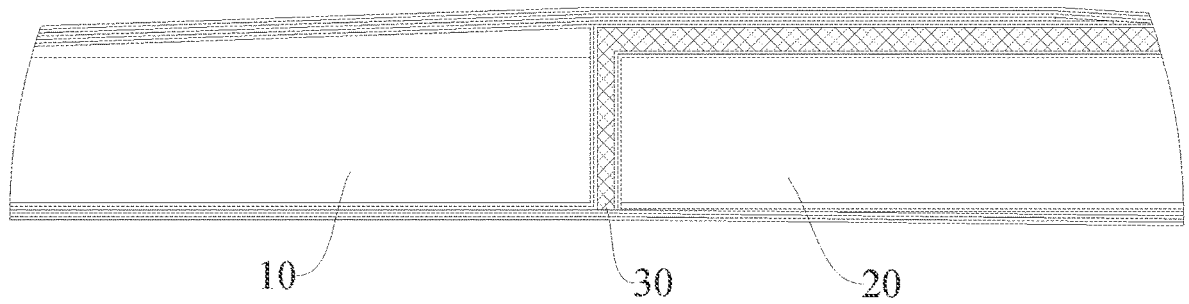
FIG. 8 is a schematic diagram of the structure of the defective position after grinding and trimming according to an embodiment of the present disclosure.

As shown in FIG. 7, if the structural adhesive overflows from the outside of the butting surfaces of the first module 10 and the second module 20 after curing by applying pressure in the thickness direction, the overflow structural adhesive is polished to eliminate defects. Since the overflow portion has cured, it affects the flatness of the outer surface between the first module 10 and the second module 20. In order to improve the overall appearance of flatness as well as to provide a good basis for subsequent processing, in the embodiment of the present disclosure, the overflow portion needs to be polished and trimmed. With continued reference to FIG. 8, in the embodiment of the present disclosure, after curing is complete and defects are eliminated, the inside of the butting surface of the first module 10 is covered with a composite reinforcement layer. Of course, if no defects are created, the composite reinforcement layer can be applied directly. Here, the application does not only refer to the application onto the inside of the butting surface, but also the application onto the outside of the butting surface.

In the embodiment of the present disclosure, there is also provided a modular blade connection tooling applied to the modular blade connection structure described above.

Figure 9:
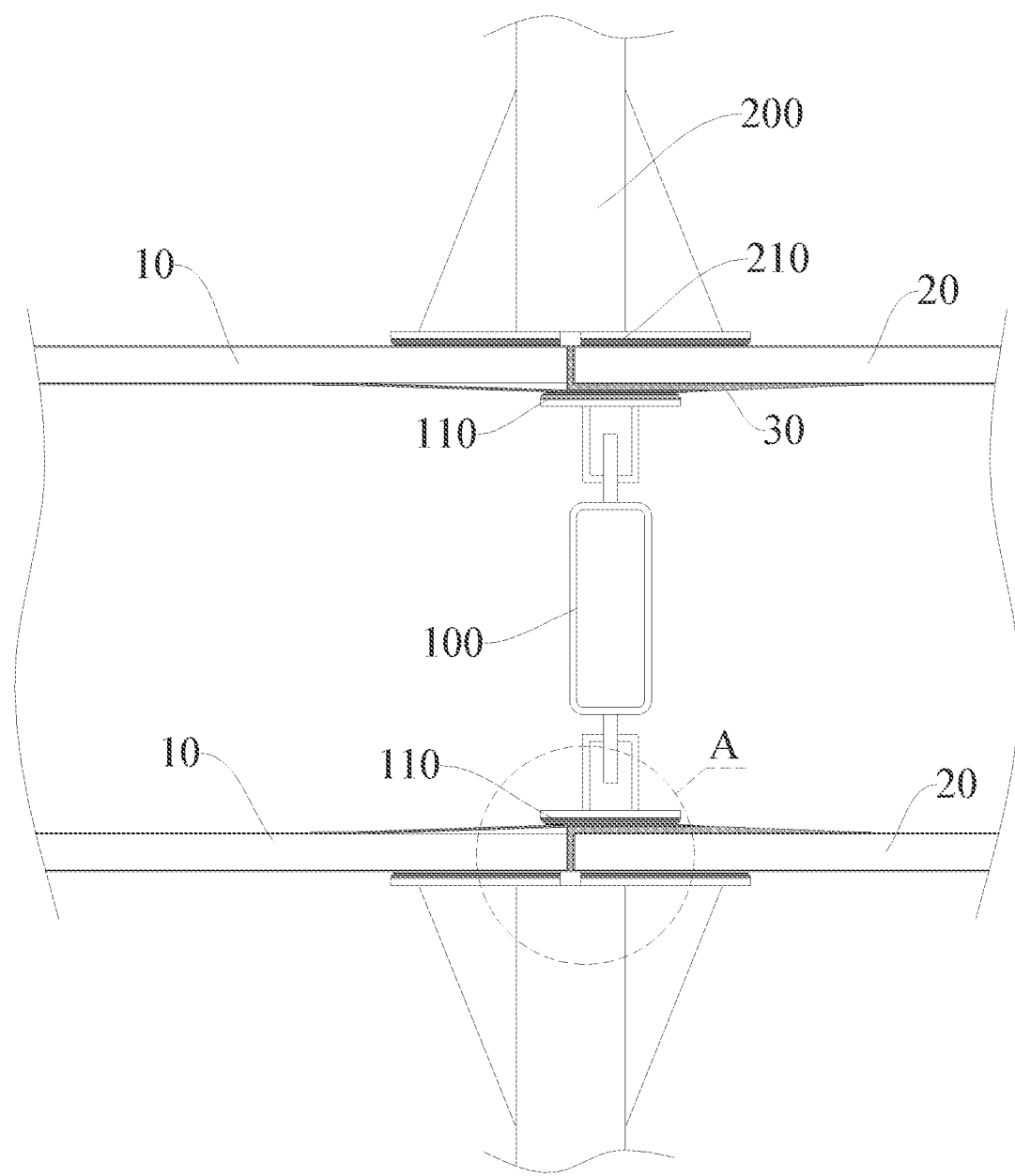
FIG. 9 is a schematic structural diagram of a modular blade connection tooling according to embodiment of the present disclosure.
Figure 10:
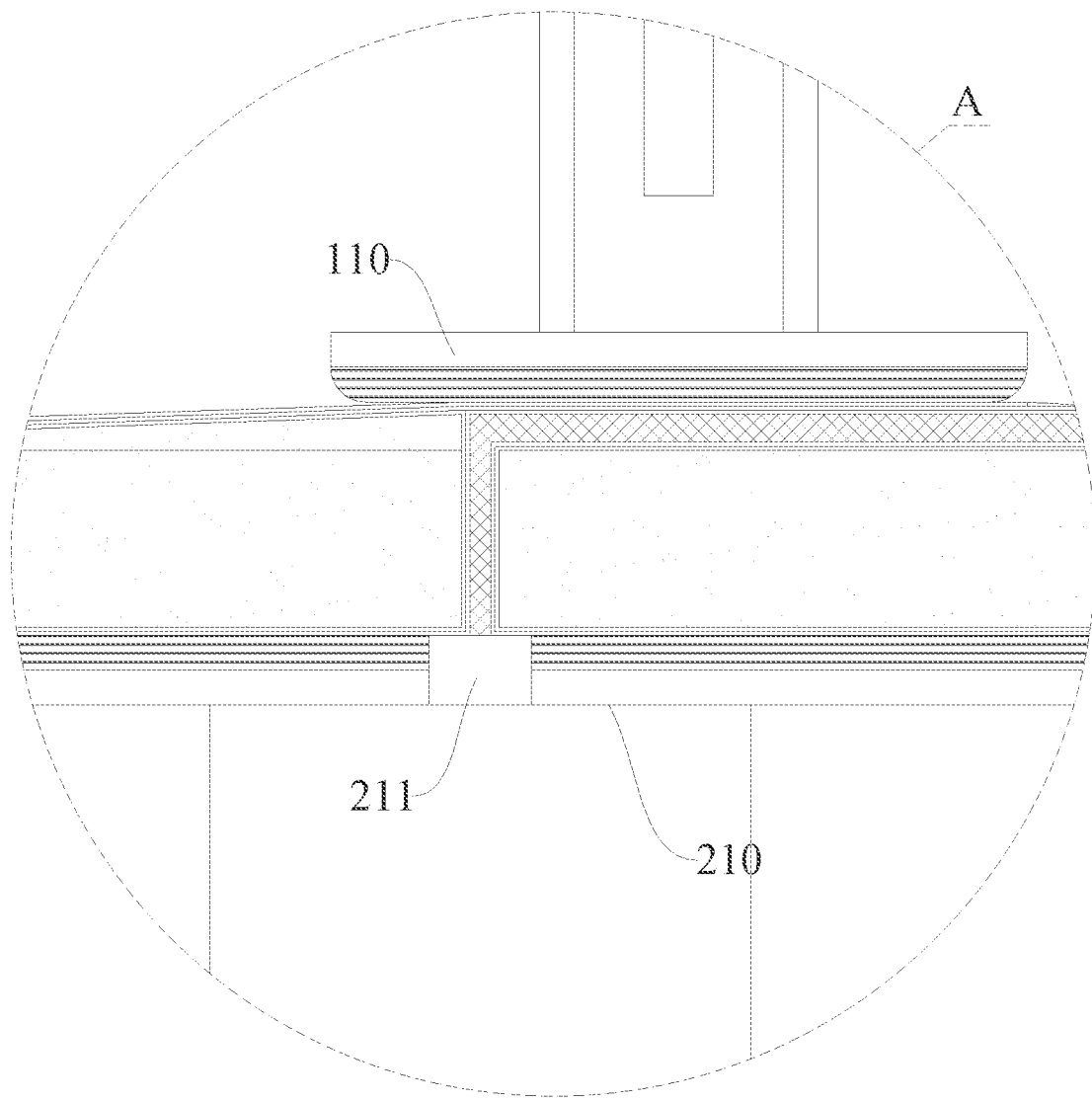
FIG. 10 is a partially enlarged view at A in FIG. 9.

As shown in FIG. 9 and FIG. 10, the tooling comprises an internal pressing mechanism provided at both ends thereof with an extrusion block in contact with part of the first reinforcement 10*a* and part of the inner wall of the bonding flange 11. The extrusion block follows the inner wall of the first module and the second module, and the internal pressing mechanism is configured to apply pressure in opposite directions. It should be noted here that this part of tooling is used only when pressure is applied in the thickness direction. The pressure application in the butting direction is carried out by means of a prior art pressure application structure, such as a hydraulic cylinder, pneumatic cylinder, or other existing pressure application mechanism.

The tooling further comprises an external support mechanism provided on the outside of the butting surfaces of the first module 10 and the second module 20 and provided opposite to each of the two extrusion blocks. The external support mechanism is provided with a bracket block following the outer surface of the first module 10 and the second module 20, and the bracket block has an adhesive overflow slot at the butting surfaces of the first module 10 and the second module 20 that is provided towards the opening of the butt joint. In the embodiment of the present disclosure, the contact of the extrusion block and the bracket block with the first module 10 and the second module 20 varies with the surface of the first module 10 and the second module 20, thus eliminating the gap in the contact and making the force application more uniform. The internal pressing mechanism here can be a jack, hydraulic cylinder or other form of force application mechanism, and the internal structural components of which are not described in detail here. In the embodiment of the present disclosure, the adhesive overflow slot on the one hand allows the user to visually observe the overflow adhesive in the process of construction in order to judge whether the application of adhesive meets the requirements, on the other hand, since the structural adhesive is not yet cured at the early stage of extrusion, the overflow adhesive can be scraped and transferred in time through the adhesive overflow slot, so as to facilitate the reuse of the overflow adhesive and improve the utilization rate of the structural adhesive.

Those skilled in the industry should understand that the present disclosure is not limited by the foregoing embodiments. The foregoing embodiments and descriptions only illustrate the principles of the present disclosure. Without departing from the spirit and scope of the present disclosure, the present disclosure will have various changes and improvements, which fall within the scope of the claimed disclosure. The scope of protection claimed by the present disclosure is defined by the appended claims and their equivalents.

The invention claimed is:

1. A modular blade connection method applied to a modular blade connection structure, the modular blade connection structure comprising: a first module, a second module and a structural adhesive;
   wherein the first module and the second module are provided opposite each other, and the first module is provided on an end face thereof with a bonding flange extending towards the second module, the bonding flange extending into the second module;
   wherein there is a gap between a butting surface of the first module and a butting surface of the second module, and between the bonding flange and an inner wall of the second module, the structural adhesive being filled in the gap and cured; and
   wherein the first module and the second module are flush at their outer surfaces, a thickness of the first module at a starting end of the bonding flange extends towards an inner surface to form a first reinforcement, and the structural adhesive extends inside the second module in a direction away from the bonding flange to form a second reinforcement,
   the modular blade connection method comprising the following steps:
   preparing the first module and the second module;
   applying the structural adhesive to the butting surfaces of the first module and the second module;
   butting the first module and the second module to a set position, and applying a set pressure along a butting direction of the first module and the second module;
   when the pressure along the butting direction reaches a stop holding pressure, applying a set pressure on both sides in the thickness direction to cause the structural adhesive at an edge of the bonding flange to overflow until the curing is completed;
   wherein the first module is thickened near the bonding flange to form the first reinforcement when preparing the first module; and
   wherein when the pressure is applied in the thickness direction so that the structural adhesive at the edge of the bonding flange overflows, the overflowing structural adhesive is scraped in the direction away from the bonding flange to form the second reinforcement.

2. The modular blade connection method according to claim 1, wherein the first reinforcement is configured to increase in thickness in a direction towards the bonding flange when preparing the first module, and the second reinforcement is configured to decrease in thickness the direction away from the bonding flange when the second reinforcement is formed by scraping.

3. The modular blade connection method according to claim 1, wherein if the structural adhesive overflows from the outside of the butting surfaces of the first module and the second module after curing by applying pressure in the thickness direction, the overflow structural adhesive is polished to eliminate defects.

4. The modular blade connection method according to claim 3, wherein after curing is completed and the defects are eliminated, an inside of the butting surface of the first module is covered with a composite reinforcement layer.

5. A modular blade connection tooling applied to a modular blade connection structure, the modular blade connection structure comprising: a first module, a second module and a structural adhesive;
   wherein the first module and the second module are provided opposite each other to form a butt joint and the first module is provided on an end face thereof with a bonding flange extending towards the second module, the bonding flange extending into the second module;

wherein there is a gap between a butting surface of the first module and a butting surface of the second module, and between the bonding flange and an inner wall of the second module, the structural adhesive being filled in the gap and cured; and wherein the first module and the second module are flush at their outer surfaces, a thickness of the first module at a starting end of the bonding flange extends towards an inner surface to form a first reinforcement, and the structural adhesive extends inside the second module in a direction away from the bonding flange to form a second reinforcement, the modular blade connection tooling comprising:

an internal pressing mechanism provided at both ends thereof with an extrusion block in contact with part of the first reinforcement and part of an inner wall of the bonding flange, the extrusion block following an inner wall of the first module and the second module, the internal pressing mechanism being configured to apply pressure in opposite directions; and an external support mechanism provided on the outside of the butting surfaces of the first module and the second module and provided opposite to each of the two extrusion blocks, the external support mechanism being provided with a bracket block following the outer surface of the first module and the second module, the bracket block having an adhesive overflow slot at the butting surfaces of the first module and the second module that is provided towards an opening of the butt joint.

\* \* \* \* \*